US006982766B1

(12) United States Patent
George et al.

(10) Patent No.: US 6,982,766 B1
(45) Date of Patent: Jan. 3, 2006

(54) DIGITAL RASTER CORRECTION

(75) Inventors: John Barrett George, Carmel, IN (US); Frank Albert Glad, El Paso, TX (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/485,940

(22) PCT Filed: Aug. 28, 1998

(86) PCT No.: PCT/US98/17920

§ 371 (c)(1),
(2), (4) Date: Feb. 18, 2000

(87) PCT Pub. No.: WO99/11054

PCT Pub. Date: Mar. 4, 1999

Related U.S. Application Data

(60) Provisional application No. 60/057,250, filed on Aug. 29, 1997.

(51) Int. Cl.
*H04N 3/22* (2006.01)
*H04N 3/26* (2006.01)

(52) U.S. Cl. .................. 348/806; 348/807; 315/368.24; 315/370

(58) Field of Classification Search ................. 348/745, 348/746, 747, 806, 807, 190, 189; 315/368.24, 315/369, 370, 371, 372, 381
See application file for complete search history.

(56) References Cited

U.S. PATENT DOCUMENTS 4,645,985 A * 2/1987 Dietz ......................... 315/371
4,810,939 A * 3/1989 Watanabe et al. ........... 315/371
5,345,280 A 9/1994 Kimura et al. ............. 348/745
5,473,223 A * 12/1995 Murakami .................. 315/367
5,877,599 A * 3/1999 Hojabri ...................... 315/370
5,909,258 A * 6/1999 Shirahama et al. ......... 348/806
6,088,015 A * 7/2000 Kato .......................... 345/134
6,108,054 A * 8/2000 Heizmann et al. .......... 348/745
6,329,768 B1 * 12/2001 Giard ........................ 315/370

FOREIGN PATENT DOCUMENTS

EP 0665695 A2 8/1994
EP 665695 8/1995
EP 0 689 363 A2 * 12/1995

OTHER PUBLICATIONS

Makoto Shimomi et al. "A Fully Digital Convergence System For Projection TV" IEEE Transactions On Consumer Electronics, vol. 36, No. 3, Aug. 1990, pp. 445–452.
Nobuo Yamazaki, et al "Digital Geometry Correction and Deflection Control System For Multi–Scan Monitors" IEEE, 1995, pp. 540–549.
Makoto Shiomi, et al., entitled "A Fully Digital Convergence System for Projection TV", published, Aug. 1990, pp. 445–452.

* cited by examiner

*Primary Examiner*—Michael H. Lee
*Assistant Examiner*—Trang U. Tran
(74) *Attorney, Agent, or Firm*—Joseph S. Tripoli; Harvey D. Fried; Christine Johnson

(57) ABSTRACT

A projection display uses a matrix of digital correction factors defining deflection correction factors between which linear interpolation is used for intermediate points on the display. A circuit for generating a correction signal to correct image distortion on a display screen, comprises a memory storing displacement values corresponding to spaced points on the screen in a grid of rows and columns. The displacement values of the grid generally define correction curves for correcting the image distortion without introducing significant banded regions on the display screen. An interpolator is coupled to the memory for interpolating intermediate values between adjacent ones of the stored displacement values, and a digital to analog converter is coupled to the interpolator for providing the correction signal.

17 Claims, 8 Drawing Sheets

GIVEN $C_1 = 100$ $C_5 = 500$

Nodes N = 5

Then Slope (d/dt)

$$= \frac{C_5 - C_1}{N-1} = \frac{500 - 100}{4} = 100$$

FIG. 10

COLUMNS

| 1 (A) | 2 (B) | 3 (C) | 4 (D) | 5 (E) | 6 (F) | 7 (G) | 8 (H) |
|---|---|---|---|---|---|---|---|
| A7+1.2*(A2-A7)-9 | B7+1.2*(B2-B7)-9 | C7+1.2*(C2-C7)-9 | D7+1.2*(D2-D7)-9 | E7+1.2*(E2-E7)-6 | F7+1.2*(F2-F7) | G7+1.2*(G2-G7)+6 | H7+1.2*(H2-H7)+9 |
| A2 | B2 | C2 | D2 | E2 | F2 | G2 | H2 |
| A7+0.8*(A2-A7)+6 | B7+0.8*(B2-B7)+6 | C7+0.8*(C2-C7)+6 | D7+0.8*(D2-D7)+6 | E7+0.8*(E2-E7)+4 | F7+0.8*(F2-F7) | G7+0.8*(G2-G7)-4 | H7+0.8*(H2-H7)-6 |
| A7+0.6*(A2-A7)+9 | B7+0.6*(B2-B7)+9 | C7+0.6*(C2-C7)+9 | D7+0.6*(D2-D7)+9 | E7+0.6*(E2-E7)+6 | F7+0.6*(F2-F7) | G7+0.6*(G2-G7)-6 | H7+0.6*(H2-H7)-9 |
| A7+0.4*(A2-A7)+9 | B7+0.4*(B2-B7)+9 | C7+0.4*(C2-C7)+9 | D7+0.4*(D2-D7)+9 | E7+0.4*(E2-E7)+6 | F7+0.4*(F2-F7) | G7+0.4*(G2-G7)-6 | H7+0.4*(H2-H7)-9 |
| A7+0.2*(A2-A7)+6 | B7+0.2*(B2-B7)+6 | C7+0.2*(C2-C7)+6 | D7+0.2*(D2-D7)+6 | E7+0.2*(E2-E7)+4 | F7+0.2*(F2-F7) | G7+0.2*(G2-G7)-4 | H7+0.2*(H2-H7)-6 |
| A7 | B7 | C7 | D7 | E7 | F7 | G7 | H7 |
| A7+0.2*(A12-A7)-6 | B7+0.2*(B12-B7)-6 | C7+0.2*(C12-C7)-6 | D7+0.2*(D12-D7)-6 | E7+0.2*(E12-E7)-4 | F7+0.2*(F12-F7) | G7+0.2*(G12-G7)+4 | H7+0.2*(H12-H7)+6 |
| A7+0.4*(A12-A7)-9 | B7+0.4*(B12-B7)-9 | C7+0.4*(C12-C7)-9 | D7+0.4*(D12-D7)-9 | E7+0.4*(E12-E7)-6 | F7+0.4*(F12-F7) | G7+0.4*(G12-G7)+6 | H7+0.4*(H12-H7)+9 |
| A7+0.6*(A12-A7)-9 | B7+0.6*(B12-B7)-9 | C7+0.6*(C12-C7)-9 | D7+0.6*(D12-D7)-9 | E7+0.6*(E12-E7)-6 | F7+0.6*(F12-F7) | G7+0.6*(G12-G7)+6 | H7+0.6*(H12-H7)+9 |
| A7+0.8*(A12-A7)-6 | B7+0.8*(B12-B7)-6 | C7+0.8*(C12-C7)-6 | D7+0.8*(D12-D7)-6 | E7+0.8*(E12-E7)-4 | F7+0.8*(F12-F7) | G7+0.8*(G12-G7)+4 | H7+0.8*(H12-H7)+6 |
| A12 | B12 | C12 | D12 | E12 | F12 | G12 | H12 |
| A7+1.2*(A12-A7)+9 | B7+1.2*(B12-B7)+9 | C7+1.2*(C12-C7)+9 | D7+1.2*(D12-D7)+9 | E7+1.2*(E12-E7)+6 | F7+1.2*(F12-F7) | G7+1.2*(G12-G7)-6 | H7+1.2*(H12-H7)-9 |

COLUMNS

| 9 (I) | 10 (J) | 11 (K) | 12 (L) | 13 (M) | 14 (N) | 15 (O) | 16 (P) |
|---|---|---|---|---|---|---|---|
| I7+1.2*(I2-I7)+9 | J7+1.2*(J2-J7)+9 | K7+1.2*(K2-K7)+9 | L7+1.2*(L2-L7)+9 | M7+1.2*(M2-M7)+6 | N7+1.2*(N2-N7) | O7+1.2*(O2-O7)-6 | P7+1.2*(P2-P7)-9 |
| I2 | J2 | K2 | L2 | M2 | N2 | O2 | P2 |
| I7+0.8*(I2-I7)-6 | J7+0.8*(J2-J7)-6 | K7+0.8*(K2-K7)-6 | L7+0.8*(L2-L7)-6 | M7+0.8*(M2-M7)-4 | N7+0.8*(N2-N7) | O7+0.8*(O2-O7)+4 | P7+0.8*(P2-P7)+6 |
| I7+0.6*(I2-I7)-9 | J7+0.6*(J2-J7)-9 | K7+0.6*(K2-K7)-9 | L7+0.6*(L2-L7)-9 | M7+0.6*(M2-M7)-6 | N7+0.6*(N2-N7) | O7+0.6*(O2-O7)+6 | P7+0.6*(P2-P7)+9 |
| I7+0.4*(I2-I7)-9 | J7+0.4*(J2-J7)-9 | K7+0.4*(K2-K7)-9 | L7+0.4*(L2-L7)-9 | M7+0.4*(M2-M7)-6 | N7+0.4*(N2-N7) | O7+0.4*(O2-O7)+6 | P7+0.4*(P2-P7)+9 |
| I7+0.2*(I2-I7)-6 | J7+0.2*(J2-J7)-6 | K7+0.2*(K2-K7)-6 | L7+0.2*(L2-L7)-6 | M7+0.2*(M2-M7)-4 | N7+0.2*(N2-N7) | O7+0.2*(O2-O7)+4 | P7+0.2*(P2-P7)+6 |
| I7 | J7 | K7 | L7 | M7 | N7 | O7 | P7 |
| I7+0.2*(I12-I7)+6 | J7+0.2*(J12-J7)+6 | K7+0.2*(K12-K7)+6 | L7+0.2*(L12-L7)+6 | M7+0.2*(M12-M7)+4 | N7+0.2*(N12-N7) | O7+0.2*(O12-O7)-4 | P7+0.2*(P12-P7)-6 |
| I7+0.4*(I12-I7)+9 | J7+0.4*(J12-J7)+9 | K7+0.4*(K12-K7)+9 | L7+0.4*(L12-L7)+9 | M7+0.4*(M12-M7)+6 | N7+0.4*(N12-N7) | O7+0.4*(O12-O7)-6 | P7+0.4*(P12-P7)-9 |
| I7+0.6*(I12-I7)+9 | J7+0.6*(J12-J7)+9 | K7+0.6*(K12-K7)+9 | L7+0.6*(L12-L7)+9 | M7+0.6*(M12-M7)+6 | N7+0.6*(N12-N7) | O7+0.6*(O12-O7)-6 | P7+0.6*(P12-P7)-9 |
| I7+0.8*(I12-I7)+6 | J7+0.8*(J12-J7)+6 | K7+0.8*(K12-K7)+6 | L7+0.8*(L12-L7)+6 | M7+0.8*(M12-M7)+4 | N7+0.8*(N12-N7) | O7+0.8*(O12-O7)-4 | P7+0.8*(P12-P7)-6 |
| I12 | J12 | K12 | L12 | M12 | N12 | O12 | P12 |
| I7+1.2*(I12-I7)-9 | J7+1.2*(J12-J7)-9 | K7+1.2*(K12-K7)-9 | L7+1.2*(L12-L7)-9 | M7+1.2*(M12-M7)-6 | N7+1.2*(N12-N7) | O7+1.2*(O12-O7)+6 | P7+1.2*(P12-P7)+9 |

DIGITAL RASTER CORRECTION

This application claims the benefit of 60/057,250 filed Aug. 29, 1997.

This disclosure relates to the field of deflection correction waveform generation and in particular to the digital generation of geometric and convergence correction signal waveforms.

BACKGROUND OF THE INVENTION

Digital convergence in a projection television receiver can be achieved using a two dimensional matrix of adjustable factors applicable to points distributed at regular intervals across the visible screen area. The degree of deflection correction may be finely adjusted at each of these points independently.

In the horizontal direction the deflection correction is determined by a numeric digital factor applicable at the matrix points, which is converted to an analog signal for driving a convergence correction coil. At intermediate points between the points on the matrix, the correction factor is determined by averaging with an analog filter. In the vertical direction it is necessary to calculate the values for the intervening scan lines between the lines corresponding to the points on the correction matrix. In a lower cost display system, correction for the lines between the points that are numerically defined are determined by taking a difference between the correction values for the nearest adjustment point above and below the point in question, dividing by the number of lines in between the adjustment points, and weighting the correction value for the particular line being determined by linear interpolation. Thus the waveform that is generated follows a straight line between the two numeric points. To facilitate interlace scanning an offset value may be added to the correction data for alternate fields.

Digital correction may affect picture geometry in addition to converging corresponding points on the three color rasters. Green is typically chosen to be centered on the projection system optical axis. In this position, the image on the face of the green tube suffers least geometric distortion. Red and blue displays are positioned on the axis vertically but typically are located off the optical axis horizontally. As a result, the red and blue rasters are additionally distorted and require keystone shaping to compensate for this off axis projection location. Because the optical distortion is minimum for the green image, it is chosen as the geometric reference. The green raster is sized and shaped by correction waveforms to minimize geometric distortion. The red and blue rasters are then matched to align precisely with the green image.

The uncorrected green raster suffers a large vertical pincushion distortion which is corrected by a correction waveform. For optimum geometry, the correction waveform along each column has a distinct S-shape having sinusoidal and parabolic components, and for the off axis red and blue images an additional linear component is required.

The correction waveform may, for example, be adjustable along a matrix of factors defining 13 rows and 16 columns. For each point in the matrix, numerical factors define the associated displacement of the red, green and blue rasters to be effected at that point for achieving accurate picture geometry and alignment of the red and blue rasters. Since the number of correction points or nodes for each column is relatively small, for example twelve points spaced vertically in the visible area of the screen, the linearly interpolated S-shaped correction waveform may have abrupt changes in slope as it crosses each node. These slope changes at each adjustment line cause blocks of raster scan lines to appear with a brightness difference due to non-uniform spacing of the horizontal lines in adjacent areas where convergence is adjusted according to different matrix factors. If a video signal having a constant level or a "flat" field is displayed, the raster will exhibit a series of distinct horizontal bands or lines of differing brightness resulting from correction waveform discontinuities.

SUMMARY OF THE INVENTION

In an inventive arrangement a circuit generates a correction signal to correct image distortion on a display screen. A memory stores displacement values corresponding to spaced points on the screen in a grid of rows and columns. The displacement values of the grid generally defining correction curves for correcting the image distortion without introducing significant banded regions on the display screen. An interpolator is coupled to the memory for interpolating intermediate values between adjacent ones of the stored displacement values. A digital to analog converter is coupled to the interpolator for providing the correction signal.

In a further inventive arrangement a video apparatus has a cathode ray tube displays an image subject to image distortion. A deflection coil is located on the cathode ray tube and is driven by a drive amplifier. A digital to analog converter generates an output signal which is coupled to the drive amplifier. A memory has stored interpolated displacement values corresponding to spaced points on the in a grid of rows and columns. An interpolator is coupled to the memory and responsive to the stored interpolated displacement values the interpolator interpolates values adjacent to ones of the stored interpolated displacement values. The digital to analog converter is coupled to the interpolator and generates a correction signal to drive the deflection coil to correct the image distortion.

IN THE DRAWINGS

FIG. 10 is a chart of equations for determining column values according to an inventive aspect and as shown in FIG. 9.

DETAILED DESCRIPTION

A digital raster correction system generally consists of a pattern generator, an amplifier for driving the convergence yokes, a memory for storing correction constants, and an interface to a controller or microprocessor. Such a system is shown with a single cathode ray tube and deflection arrangement in FIG. 1.

The digital raster correction system includes an internal controller 102. A microprocessor 30A may be employed together with an external video circuit 20 coupled to a convergence pattern generator 120 for independent adjustments and viewing of geometric or convergence correction. An external setup microprocessor, shown with a dotted outline, is used to process initial adjustment values which are written to EEPROM 103. Such an external microprocessor driven adjustment may be accomplished using automatic means to record and analyze convergence test pattern displays, and for generating initial or updated correction factors. Adjustments to geometric or convergence correction may be required, for example, to correct for misconvergence resulting from changes in display orientation relative to the Earth's magnetic field or as a result of component failure, and these changes to the correction values stored EEPROM 103 may be accomplished by microprocessor 30A.

Figure 1:
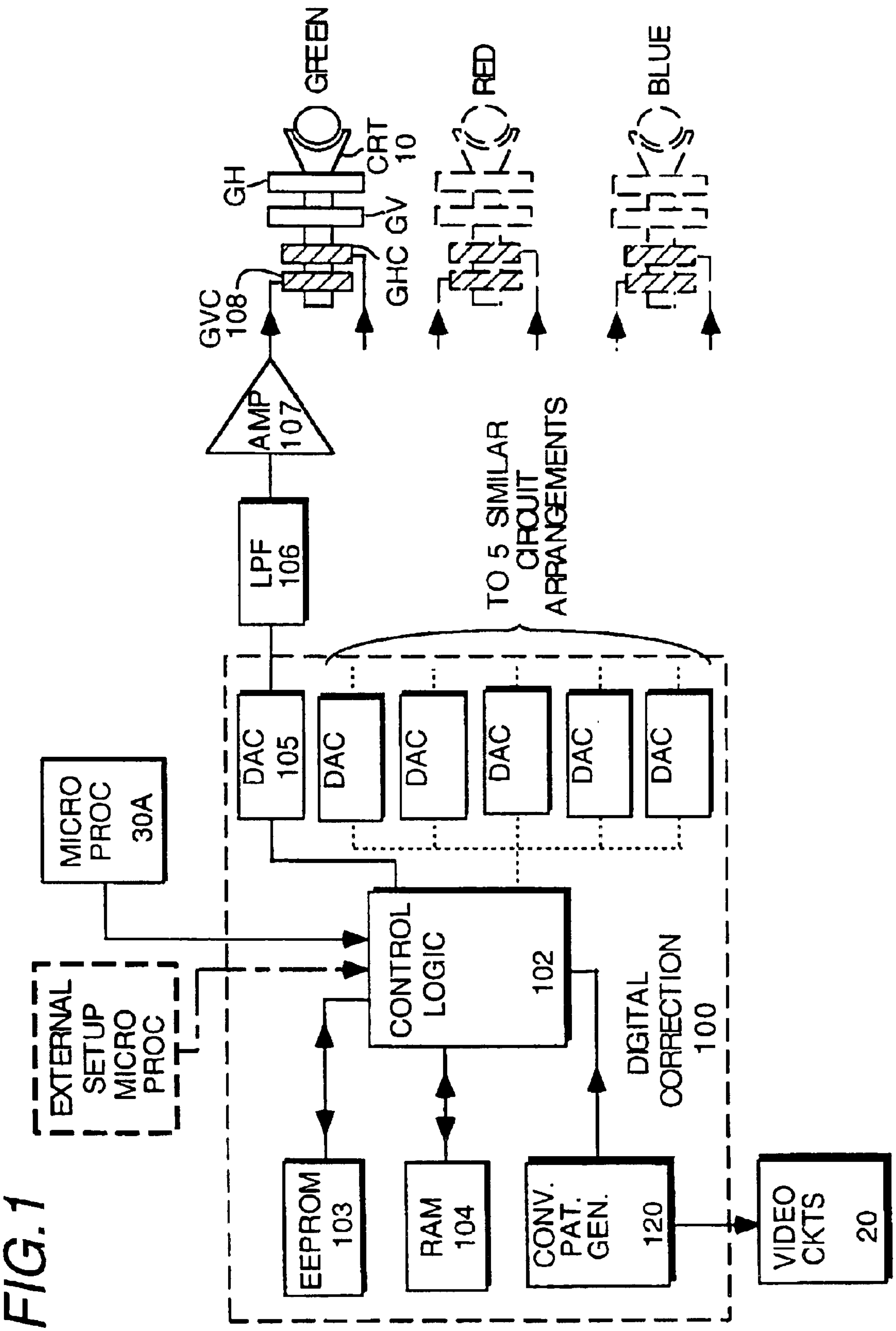
FIG. 1 is a block diagram showing the elements of a digital correction circuit.
Figure 2:
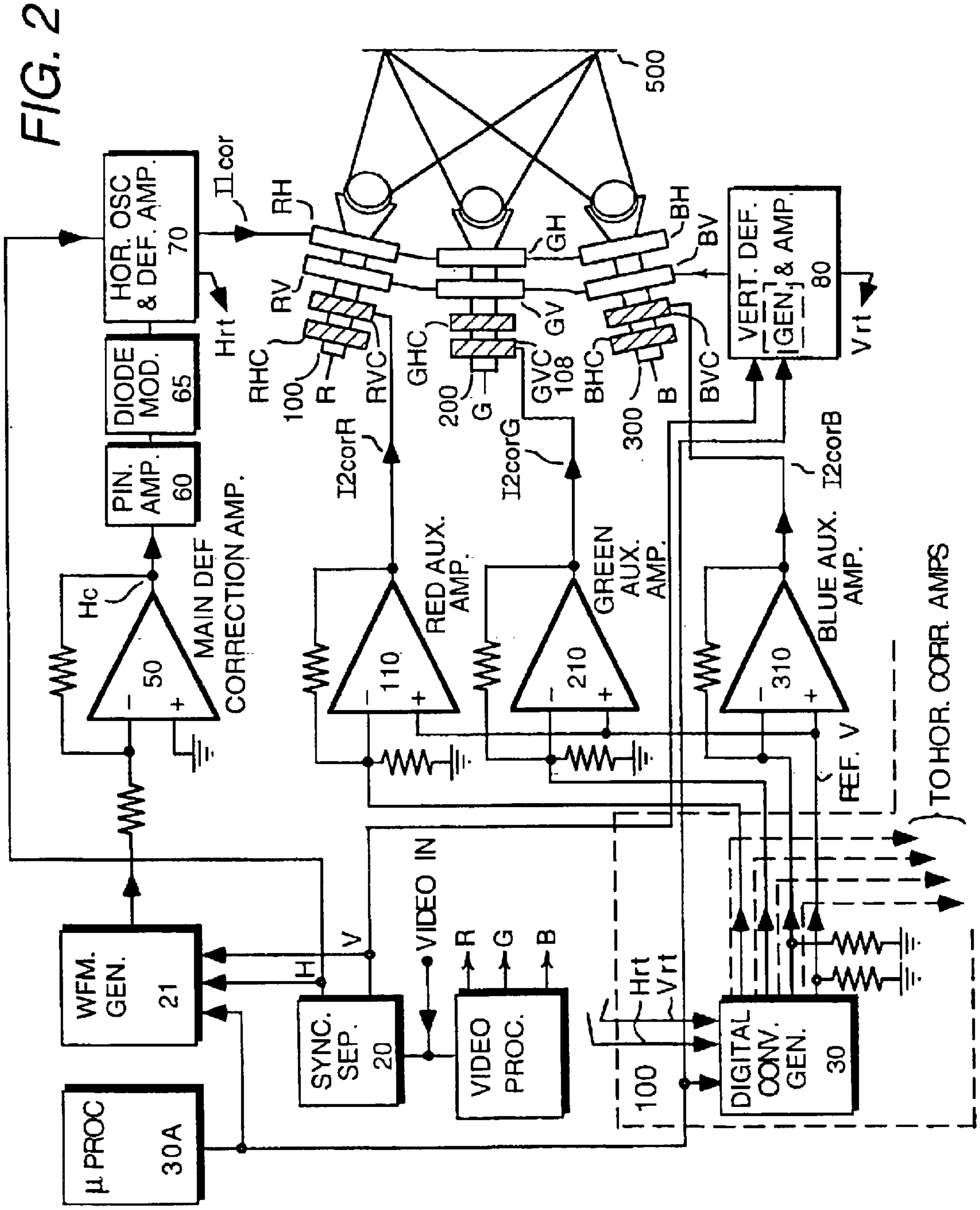
FIG. 2 is a block diagram illustrating a projection display having digital raster correction means.

FIG. 1 illustrates some digital portions and FIG. 2 illustrates the drive circuits and CRTs of an exemplary projection display system with which the digital raster correction method and apparatus of the invention may be advantageously employed. Digital correction circuit 100 in FIG. 1 includes EEPROM 103, which provides nonvolatile storage of correction or adjustment factors, internal RAM 104 for volatile storage, and a digital to analog converter DAC 105, each coupled to controller 102.

Geometric or convergence adjustments are made by defining a matrix of adjustment points for each of the three colors. The on-screen video pattern generator 120 can provide location references for adjustments at particular locations on the display corresponding to the matrix of data points stored in EEPROM 103. Adjustment or correction data from EEPROM 103 can be read into internal RAM 104 at power-up, and then used to generate further factors such as interpolated factors for use between adjacent reference locations. Internal RAM 104 stores 1248 data words which represent a matrix of 13 by 16 points, with X alignment points horizontally by Y alignment points vertically, by 2 representing horizontal and vertical corrections, by 3 representing the three display devices forming R, G and B images.

Figure 3:
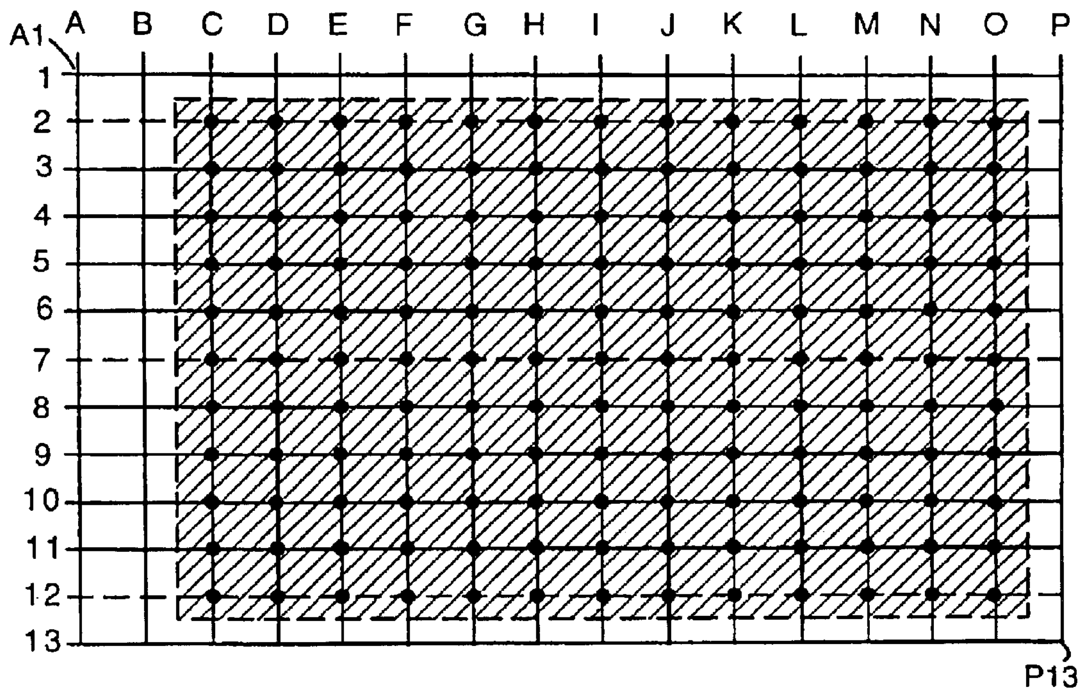
FIG. 3 illustrates a nominal raster pattern with ideal geometry, the visible portion being cross hatched and a matrix of adjustment points being shown as circles or dots.

The active scan area of a display means, for example, is divided into a matrix of rows and columns, for the purposes of corrective control. The boundary lines of the rows and columns can be considered to define a cross hatch grid. FIG. 3 shows an exemplary display screen illustrating such a cross hatch grid in which the active or visible area is defined by a shaded rectangle. For purposes of illustration, the number of vertical grid points or samples is 13, and the number of horizontal samples is 16. These numbers are chosen merely for example. The number of rows and columns, and the resulting sections, are selected depending on the desired extent of correction in the resulting raster.

Positive or negative horizontal and vertical corrections may be employed for each of the three colors at each measurement point, as well as on the intervening horizontal scan lines between the measurement points. Referring to FIG. 1, the signals are read out by controller 102 and coupled to digital to analog converter 105, the output of which is smoothed by low pass filter 106 and amplified by drive amplifier 107. The filter output is a current signal representing the current necessary in correction coil 108 to correctly converge, or minimize geometric distortion of the raster generated on CRT 10. Amplifier 107 may be a feedback amplifier that measures instantaneous coil current and matches the current in correction coil 108 as a function of the output of digital to analog converter (DAC). 1.05 as the adjustment factors are read out during raster scanning. The correction current flow through coil 108 results in the raster scanned image formed by on CRT 10 appearing with convergence correction or minimized geometric distortion.

Figure 4:
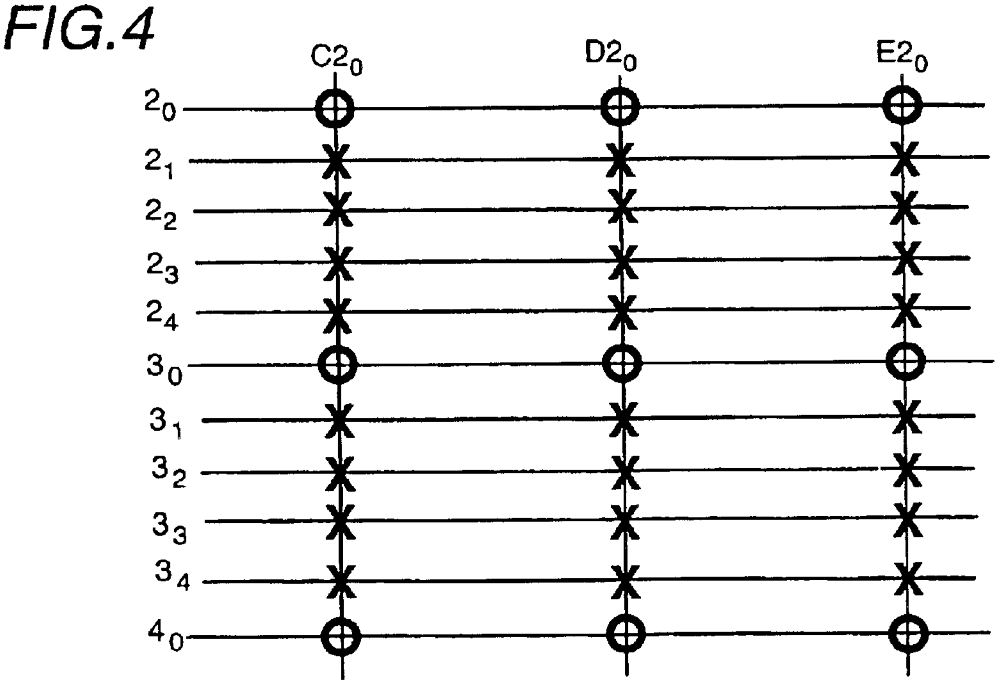
FIG. 4 shows a portion of the pattern of FIG. 3 with interpolated points between the adjustment points shown as crosses or X's.

In FIG. 4, the six circled points $\mathbf{C2}_0$ through $\mathbf{E4}_0$ represent a subset of point locations for which correction data is defined. The correction values at grid points marked X, $\mathbf{C2}_1$ through $\mathbf{C2}_4$, for example, namely the values used between $\mathbf{C2}_0$ and $\mathbf{C3}_0$, are calculated by interpolation between the values of $\mathbf{C2}_0$ and $\mathbf{C3}_0$. As a result, if the correction values are plotted for the columns, they are categorized by linear straight lines between the circles, with discontinuities, or abrupt changes of slope, occurring at the circled points.

In FIG. 2, separate red, green and blue amplifiers 110, 210, 310 correspond to amplifier 107 in the more general diagram of FIG. 1. Amplifiers 110, 210; 310 drive correction coils RVC, GVC, BVC with signals provided by digital convergence generator 30, shown generally in FIG. 2. Corresponding amplifiers (not shown) are provided for horizontal correction coils RHC, GHC, BHC. The signals driving correction amplifiers 110, 210, 310 and their respective coils are read out synchronously with the horizontal and vertical rates as provided by a sync separator 20. The horizontal and vertical rates are also coupled to a bus controlled waveform generator 21 which generates horizontal and vertical waveforms. The vertical sawtooth signal is adjusted within generator 21 to provide pincushion, trapezoidal and S correction and this shaped, or pre-distorted waveform is coupled to a vertical deflection amplifier 80 and deflection yokes GV, RV, BV of three CRTs. In FIG. 2, the vertical deflection generator and amplifier 80 is depicted with a dotted box to indicate that vertical waveform generation and shaping occurs within waveform generator 21.

Figure 5:
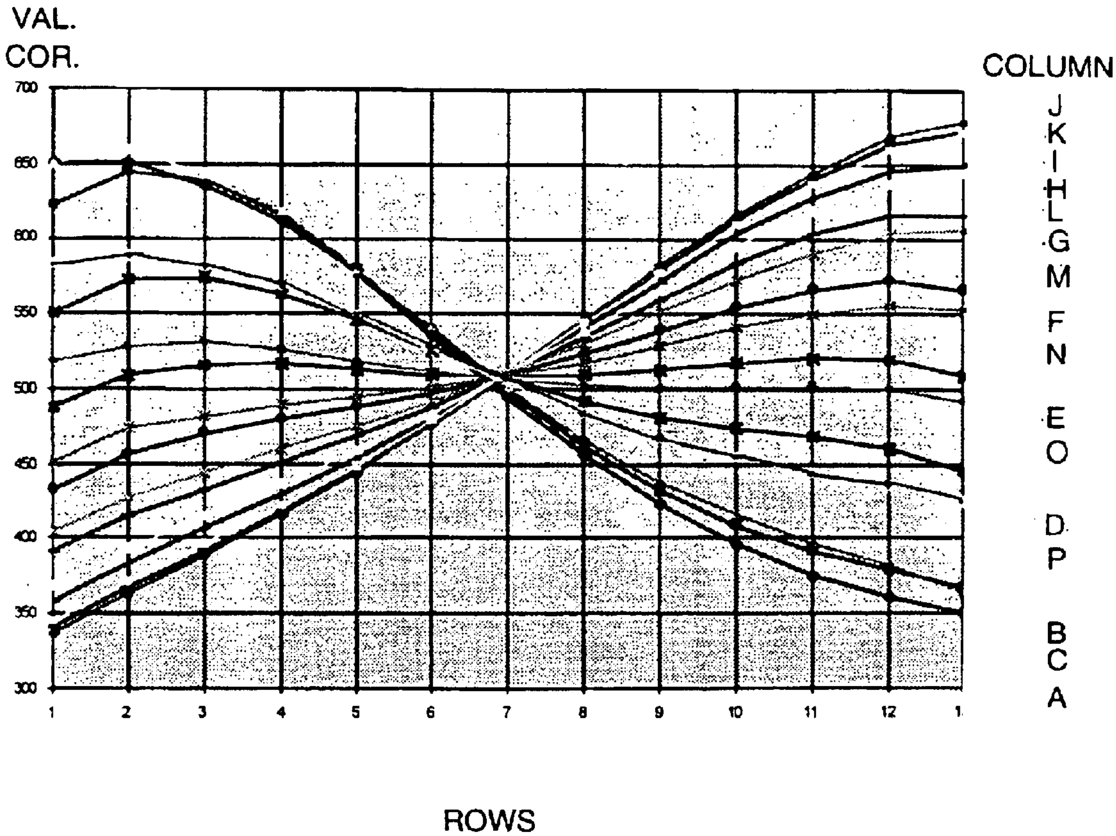
FIG. 5 is a plot of ideal geometry convergence correction waveforms for the columns of a center axis raster (e.g., the green raster of a projection television), except having straight lines connecting the adjustment points as characteristic of linear interpolation.

FIG. 3 may be considered to represent a green reference crosshatch pattern with perfect geometry, as might be achieved by the correction curves shown in FIG. 5. The Y axis of FIG. 5 shows the numeric correction values that drive the vertical green digital-to-analog converter and represent correction current amplitude in correction coil GVC. Each of the sixteen curves is a line plot wherein the discrete values at spaced adjacent points along each of the 16 vertical columns of the cross hatch are connected by lines. Series $C_0$–$O_0$ are the columns that are visible on the screen. Series A, B and P occur during horizontal retrace and may be used for fine adjustment of the vertical position of the ends of the cross hatch horizontal lines.

Whereas there are more horizontal lines in the display than vertical points in a matrix of the convergence correction factors as suggested by FIG. 4. In order to proceed smoothly from one matrix value to the next, controller 102 linearly interpolates the value for each successive vertically spaced horizontal scan line. Referring to FIG. 4, the correction at the intermediate "X" lines between matrix points $\mathbf{C2}_0$ and $\mathbf{C3}_0$ progresses linearly in equal increments. Subpoint $\mathbf{C2}_1 = \mathbf{C2}_0 + (\mathbf{C3}_0 - \mathbf{C2}_0)/5$, and subpoint $\mathbf{C2}_2 = \mathbf{C2}_{0+2} * (\mathbf{C3}_0 - \mathbf{C2}_0)/5$, etc. The correction values for the circled matrix points are stored in EEPROM 103 and read out at startup of the display. The values for the intermediate or "X" points may be calculated upon startup and stored in RAM 104, or calculated "on the fly" during each display period from the stored circled matrix point values using an interpolation integrated circuit such as the SGS Thomson STV4020 Digital Convergence IC. Alternatively, the incremental difference (e.g., (C3−C2)/5) may be calculated at startup and stored, and added incrementally to $\mathbf{C2}_0$ or the preceding convergence correction factor used.

Figure 6:
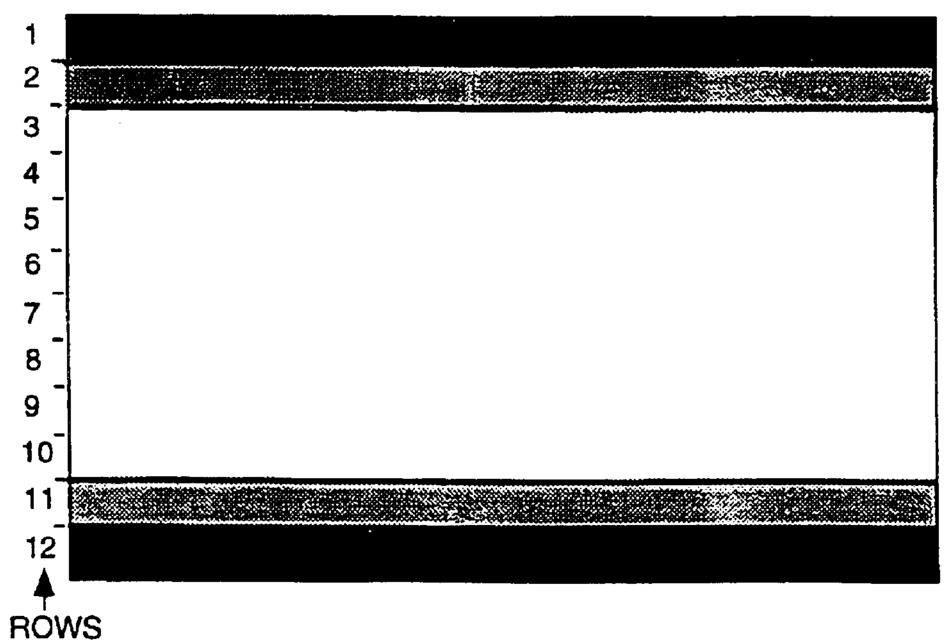
FIG. 6 depicts a flat field video raster with brightness banding resulting from abrupt slope changes in a column correction waveform due to linear interpolation between discrete matrix adjustment points depicted in FIG. 5.

Linear interpolation is relatively simple but produces sharp inflection points where the slope of the nominally S-shaped correction waveform changes. If the values shown in FIG. 5 are used, the top and bottom of an unmodulated or "flat field" raster will display banded regions of differing intensity, actually row to row differences in vertical placement of horizontal scan lines. The result of such correction waveform discontinuities is shown in FIG. 6, which for illustrative purposes is exaggerated and ignores optical projection brightness effects. The banded regions, depicted in FIG. 6, result from abrupt changes in slope near the ends of some of the plots. Since the green CRT (image) contributes about 60% of the luminance of a white field, such brightness banding is most noticeable and unacceptable.

Figure 7:
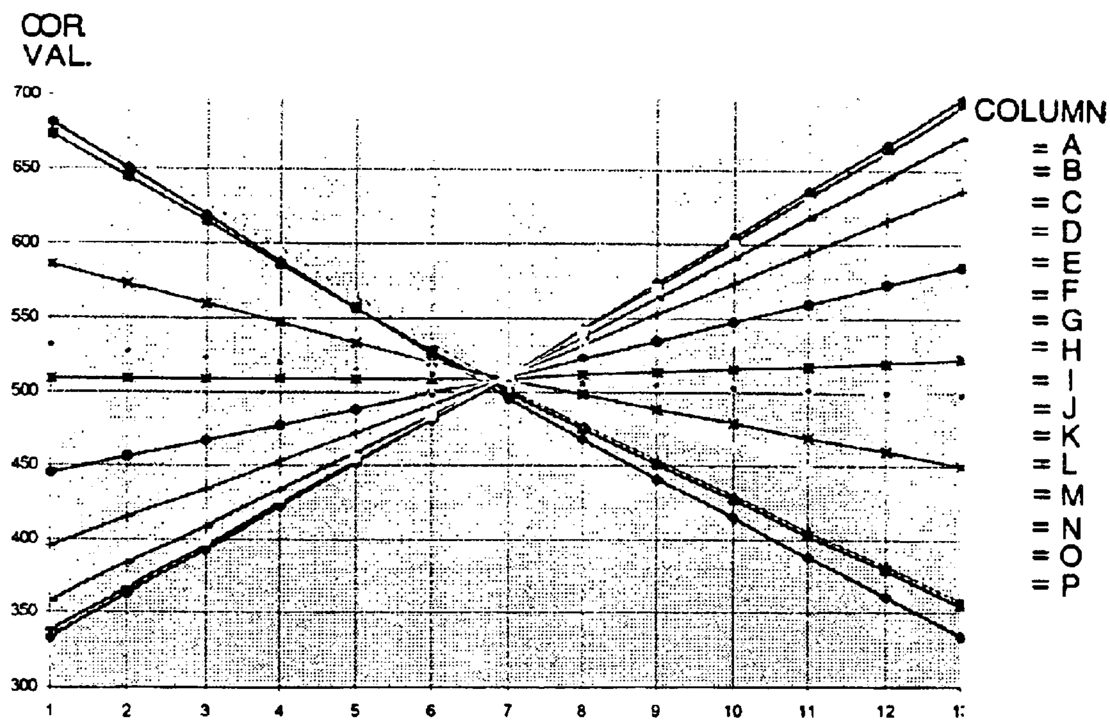
FIG. 7 is a plot of linear rather than S-shaped correction waveforms for eliminating banding as in FIG. 6.

If the correction values along each column had no changes of slope, as shown in FIG. 7, banding is eliminated. Banding can be minimized or eliminated by altering the correction factors used, to smooth the changes in slope. For example, the data can be adjusted such that the second derivative of the correction waveform along each column is, continuous, or nearly continuous. Banding could be wholly eliminated by making the correction waveforms along each column linear, for example, making the second derivative zero.

Figure 8:
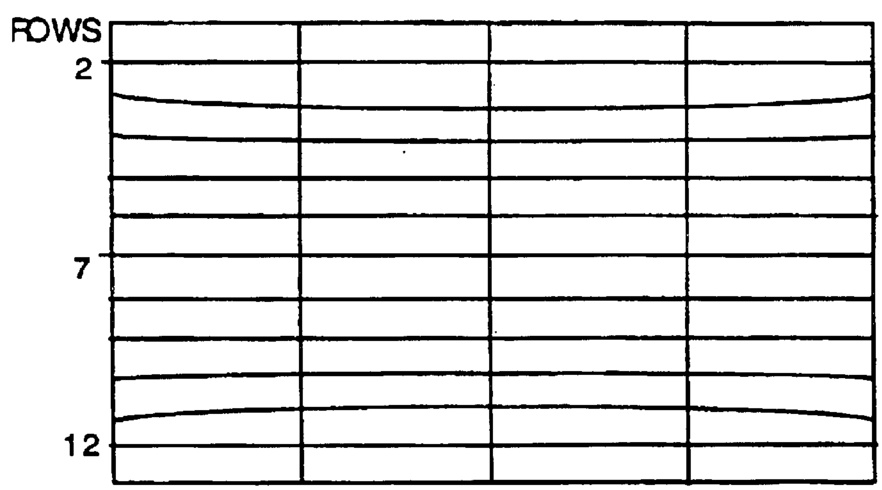
FIG. 8 shows inner pincushion distortion produced by linear column correction as depicted in FIG. 7.

Banding may be eliminated by taking measured correction values for horizontal matrix or adjustment lines 2 and 12 of each column, and calculating a straight line between these values, that is, linearly interpolating the entire waveform for each column. However, such a linear column correction results in imperfect correction of vertical pincushion distortion because the required geometrically-dictated correction waveform is S-shaped, rather than a linear function, and has an amplitude that varies with the position of the column relative to the center vertical axis of the screen. This linearized, rather than S-shaped correction waveform produces a crosshatch display with straight top and bottom horizontal lines (2 & 12) and pincushion curvature inward from the top and bottom reducing to zero distortion at centerline (7) on all the inside horizontal lines. The resultant geometric distortion is depicted in FIG. 8. Horizontal matrix lines 1 and 13 are not visible because they are occur beyond the displayed area but if they were visible, they would slightly barrel outward. Pincushion curvature of this type is unacceptable because it geometrically distorts the image as a function of position on the screen. For example, the distortion causes curved edges of on-screen picture elements that a viewer knows to be straight. Blocks and lines such as the edges of menus and stock market strips, for example, are expected and required to appear straight.

A vertical rate analog convergence signal with an S-shape may be employed to correct the inner pincushion distortion described above, and to make fine adjustments to address the remaining distortion with signals derived from digital correction factors. Since the analog correction is continuous and a digital part of the correction may be relatively small, problems with banding and pincushion distortion are reduced. However, consistency of such analog correction signal is difficult to maintain due to component tolerance and temperature variations. Thus resulting compensation for such analog signal instability may result in undesirable added circuit complexity, cost and power dissipation.

It is possible to calculate and store correction values of each raster line. This calculation can include forcing a continuous or zero second derivative along each correction column. However, this method is relatively costly and complex, and may suffer from the tradeoff between banding minimization and pincushion distortion, as discussed above.

In a display, banding may be minimized to be substantially unnoticeable in the interest of accurate displayed image geometry. It was found experimentally in equipment according to this example, that banding in a flat field video image was substantially undetectable if the slope changes in the linearly interpolated data were permitted but held to be within a minimized range. For example, the curve for a vertical column may be adjusted to bend no more than plus or minus five steps of a Digital to Analog Converter (DAC) per crosshatch adjustment segment. A maximum curvature of three steps per adjustment segment was selected to facilitate S correction while maintaining banding at a substantially undetectable level.

According to an inventive aspect, a modified linearization technique is used to concurrently render banding substantially undetectable and significantly reduce distortion resulting from correction value linearization. Referring to the matrix of FIG. 3, for example, a vertical sawtooth waveform is generated by bus controlled waveform generator 21 and coupled to drive the three vertical deflection yokes GV, RV, BV. The vertical saw is adjusted within generator 21 to provide S-correction to minimize the geometric distortion of the crosshatch along columns F and N. These columns then have linear convergence correction in the vertical direction. Thus S-correction in the vertical deflection coil minimizes the magnitude of S-curvature correction signal applied to the convergence coil, which changes polarity on opposite sides of the axial center. The other columns are given correction coil S correction which is limited to 3 LSB steps divergence from the linear value. Columns A–D, H–L and P have 3 step curvature and columns E, G, M and O have 2 step curvature. The result is a simultaneous minimization of banding and pincushion distortion, such that a significantly improved picture can be consistently achieved with digital convergence correction using linear interpolation between successive correction matrix points.

Figure 9:
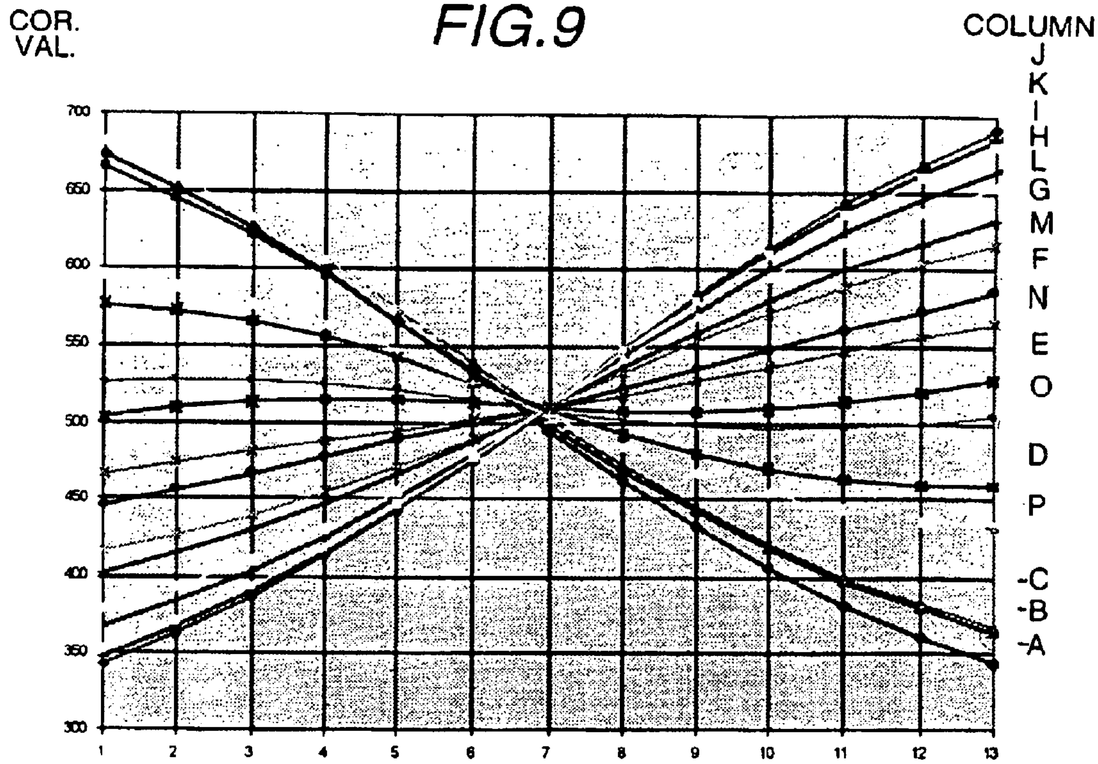
FIG. 9 is a plot of column corrections according to an inventive aspect.

Column curves obtained from the equations are shown in FIG. 9 and the equations are set forth in FIG. 10. The resulting crosshatch display produced with these equations is substantially as the ideal cross hatch shown in FIG. 3.

Devices that provide digital convergence correction with linear interpolation can be corrected for banding by forcing the second derivative of the correction waveform to be continuous at the endpoints of adjacent interpolation intervals. The invention described herein maintains the second derivative at substantially zero by linearization in the necessary areas, thereby removing banding. This is performed using linear interpolation with adjustments according to the equations shown.

According to an inventive aspect, specific horizontal lines located along the correction node points of a generated video crosshatch pattern are measured and corrected. According to a further aspect, only the green vertical corrections preferably are subject to banding linearization algorithm to render banding in the green display image imperceptible. The green vertical raster component is corrected because the green image contributes about 60% of the perceived display brightness and thus visible image degradation results if banding is present. Since the red and blue images contribute smaller amounts to the overall brightness, about 30% and 10% respectively, their contributions to the visibility of banding may be ignored. Red and blue raster corrections may be calculated to place them exactly on top of the green image without the requirement for linearization to suppress banding. However, use of the banding linearization algorithm is not excluded from use for red and blue raster corrections.

Since the vertical corrections are somewhat interactive, the entire alignment process is iterative with measurements of line location being made and corrections calculated and applied until lines 2, 7 and 12 (of FIG. 3) are in the geometrically correct, absolute locations. Inasmuch as the slope or first derivative of the correction waveform down a column is constant where linearized, the second derivative is zero. The mathematical requirements are satisfied, and banding is eliminated.

Figure 11A:
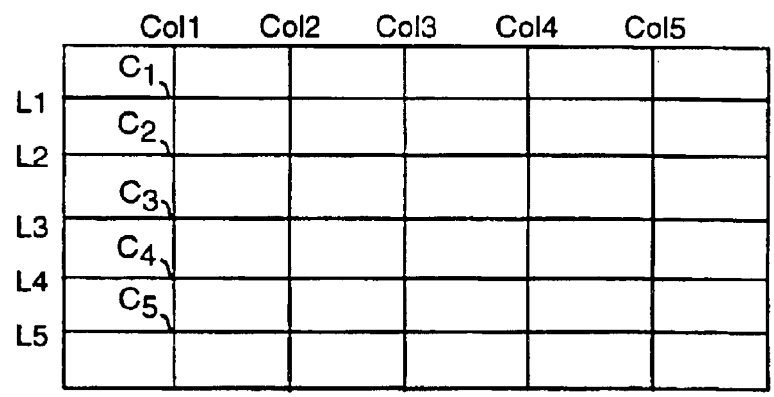
FIGS. 11A and 11B are five by five adjustment matrices illustrating simplified linearizing value interpolation and of S-correction of selected linearized matrix column values.

In a simplified example matrix shown in FIG. 11A, measurements are made to determine the exact location for only lines 1 and 5. The locations of the intervening lines 2–4 are determined by calculating the difference between the values of correction 1 and correction 5 and dividing by the number of intervening nodes minus 1. This correction differential is added to the preceding value to establish the correction value at node N−1, and represents the correction increment down each column between lines L1 and L5.

One artifact of this approach is that the intervening node points may not be at desired locations. In fact, the locations of these lines tend to result in inner pincushion distortion. In FIG. 11A lines 2 and 4 would exhibit some degree of curvature, which might be objectionable. The amount of distortion is dependent on optics and projected image magnification. Although banding may be eliminated by reducing the second derivative to zero by linearization, it was recognized that banding may be rendered substantially undetectable even if the second derivative is not zero but allowed to have a small, limited variation. In an inventive arrangement geometric distortion, for example inner pincushion, may be corrected by the addition of an S-component to specific columns of corrections. The small variation or difference between correction values which provides S-correction depends on various system considerations, for example, the number of vertical measurement nodes, the number of D/A steps utilized, the deflection sensitivity and the like. In this exemplary system the variation corresponds to about two to three least significant bits (LSB's) in the corrections written to the nodes. This allowable variation permits a small degree of S-correction to be added certain columns of correction values. Due to symmetry about the center, the magnitude of the required S-correction increases as the area of interest moves away from center and then decreases approaching the edge.

Figure 11B:
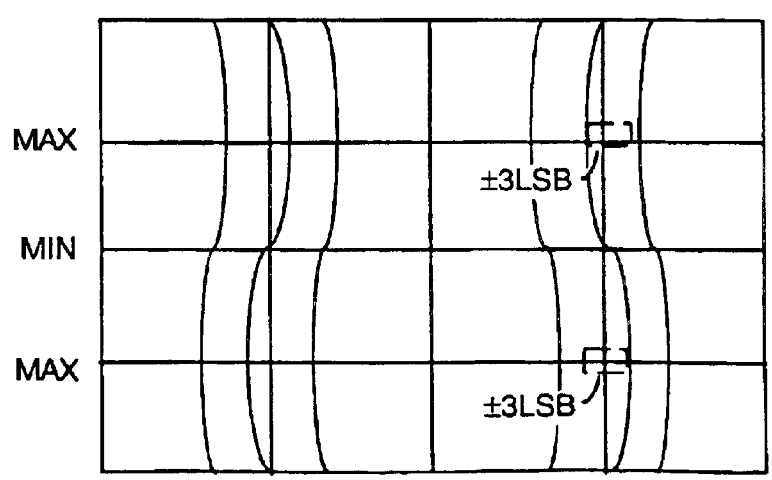
Figure 12:
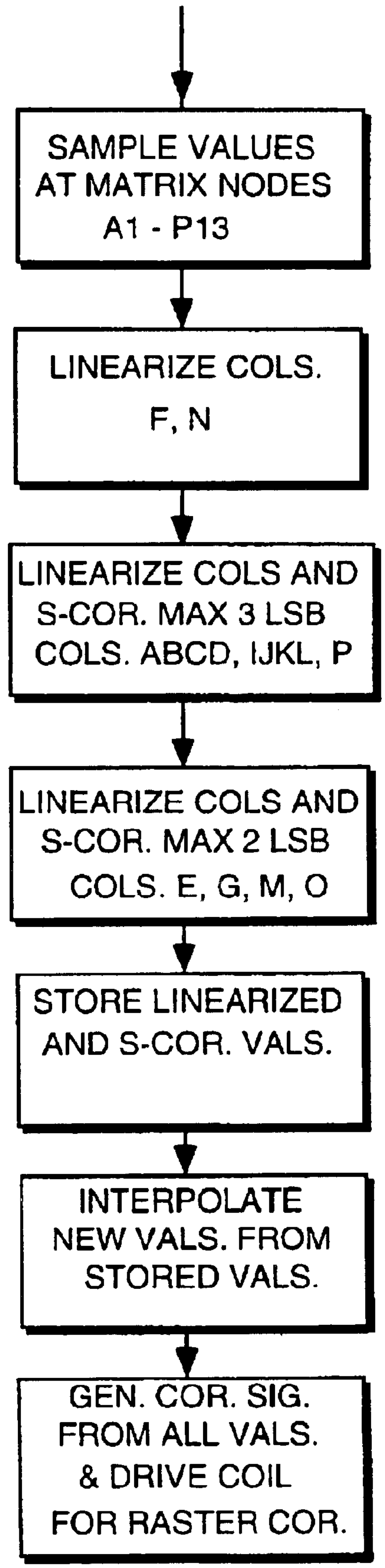
FIG. 12 is a simplified flow chart illustrating an advantageous addition of S-curvature to a linearized 13 by 16 correction matrix.

FIG. 12 is a simplified flow chart depicting a method for the derivation and application of the corrective values of FIG. 10, which render banding undetectable and provide S-correction to a vertical raster component. FIG. 11B illustrates inner pincushion distortion. FIG. 11A simplified matrix which demonstrates the effect of adding S-correction, in an example that assumes that the columns have only five matrix points representing the top, bottom, midpoint and two quarter points. In this example, if the correction range is 0 to 1023, which allows correction variation on the order of 6 to 12 correction steps. Assuming for the five vertical matrix points of column 1 that nodes $C_1$ and $C_5$ have measured correction values of 100 and 500 respectively, absolute banding removal by linearization would provide values of:

C=100
C=200
C=300
C=400
C=500

If maximum S-correction is 12 correction steps, the result is:

C=100
C=212
C=300
C=388
C=500

The added S-correction has the effect of moving location C downward while moving location $C_4$ upward. In this simplified model, the second column Col2, uses half of the correction of column Col1 with the center column, Col3, requiring no S-correction.

A further refinement is useful in production situations where the variability of optics and electronics assemblies requires additional adjustment. As applied to the above example, this refinement consists of optimization of the magnitude of S correction, within the 2–3 LSB limitations, to achieve the best positioning (pincushion minimization) of lines 2 and 4 down each of the columns. This approach, although empirical and iterative in nature, becomes much more effective as the number of nodes down a column increases.

Application of the methods disclosed above renders banding artifacts, common to digital convergence correction devices, substantially undetectable while minimizing geometric image distortion.

What is claimed is:

1. A video display apparatus, comprising:

a plurality of cathode ray tubes for projecting an image subject to image distortion on a display screen, each of said cathode ray tubes having at least one vertical deflection coil and at least one convergence coil mounted thereupon, a first correction signal generator providing a first correction signal to said vertical deflection coils;

a second correction signal generator providing a second correction signal to said convergence coils;

a video pattern generator for generating said image upon said display, said image comprising rows and columns of spaced points generally defining a cross hatch grid;

wherein said first correction signal provides correction for selected columns of said cross hatch grid;

wherein said second correction signal provides correction for at least one column of said cross hatch grid other than said selected columns.

2. The video display apparatus of claim 1 wherein said first correction signal provides a generally S shaped waveform.

3. The video display apparatus of claim 1 wherein said second correction signal generator includes a first memory for storing correction values corresponding to respective spaced points of said cross hatch grid.

4. The video display apparatus of claim 1 wherein the stored correction values are interpolated values.

5. The video display apparatus of claim 3 wherein said second correction signal generator further includes an interpolator coupled to a memory, said interpolator providing interpolated correction values.

6. The video display apparatus of claim 4 wherein said second correction signal includes said interpolated correction values.

7. The video display apparatus of claim 4 wherein said interpolation values are linear interpolation values.

8. The video display apparatus of claim 4 wherein said second correction signal generator includes a second memory for storing said interpolated values.

9. The video display apparatus of claim 4 wherein said interpolator comprises an SGS Thomson STV4020 Digital Convergence Integrated circuit.

10. The video display apparatus of claim 4 wherein said second correction signal generator provides said linear interpolated section values to said convergence coil such that the slope of said second correction signal waveform between any two adjacent ones of said intermediate points is limited to a predetermined range of values.

11. The video display apparatus of claim 10 wherein said predetermined range of values ranges between about plus and minus five steps of said digital to analog converter (DAC).

12. The video display apparatus of claim 10 wherein said predetermined range of values ranges between about plus and minus three steps of said digital to analog converter (DAC).

13. The video display apparatus of claim 10 wherein said predetermined range of values ranges between about plus and minus three steps of said digital to analog converter (DAC) for a first subset of said other columns, and between about plus and minus two steps of said digital to analog converter (DAC) for a second subset of said other columns.

14. The video display apparatus of claim 1 wherein said selected columns comprise columns A–D, H–L and P, and said other columns comprise columns E, G and M.

15. The video display apparatus of claim 7 wherein said second correction signal generator adjusts said linear interpolated correction values such that the slope of said second correction signal waveform between any two adjacent ones of said intermediate points comprising selected other columns of said crosshatch grid is limited to a predetermined range of values.

16. The video display apparatus of claim 7 wherein said plurality of cooperating cathode ray tubes comprise at least one red cathode ray tube, at least one green cathode ray tube, and at least one blue cathode ray tube and wherein said second correction signal generator adjusts said linear interpolated correction values for said green cathode ray tube such that the slope of said second correction signal waveform between any two adjacent ones of said intermediate points is limited to a predetermined range of values.

17. The video display apparatus of claim 1 wherein said first correction signal is an S correction signal and said second correction signal is an S curvature correction signal.

* * * * *